(12) United States Patent
Saarinen et al.

(10) Patent No.: US 12,013,308 B2
(45) Date of Patent: Jun. 18, 2024

(54) DECISION OF FAULTY BEARING (71) Applicant: ABB Schweiz AG, Baden (CH)

(72) Inventors: Kari Saarinen, Vasteras (SE); Jarno Kansanaho, Jamsa (FI)

(73) Assignee: ABB Schweiz AG, Baden (CH)

( * ) Notice: Subject to any disclaimer, the term of this patent is extended or adjusted under 35 U.S.C. 154(b) by 88 days.

(21) Appl. No.: 16/334,561

(22) PCT Filed: Oct. 6, 2017

(86) PCT No.: PCT/EP2017/075514
§ 371 (c)(1),
(2) Date: Mar. 19, 2019

(87) PCT Pub. No.: WO2018/069187
PCT Pub. Date: Apr. 19, 2018

(65) Prior Publication Data
US 2021/0025781 A1 Jan. 28, 2021

(30) Foreign Application Priority Data
Oct. 11, 2016 (EP) .................................. 16193178

(51) Int. Cl.
*G01M 13/045* (2019.01)
(52) U.S. Cl.
CPC ................. *G01M 13/045* (2013.01)
(58) Field of Classification Search
None
See application file for complete search history.

(56) References Cited

U.S. PATENT DOCUMENTS

| 3,699,806 A | 10/1972 | Weichbrodt |
| 4,884,449 A | 12/1989 | Nishimoto et al. |
| 5,465,321 A * | 11/1995 | Smyth ................. G06F 11/2257 706/20 |
| 5,511,422 A * | 4/1996 | Hernandez ............. G01H 1/003 702/199 |

(Continued)

FOREIGN PATENT DOCUMENTS

| CN | 1688874 A | 10/2005 |
| CN | 1818595 A | 8/2006 |

(Continued)

OTHER PUBLICATIONS

Espace.Net WO 00/04361, Makkonen, Bearing Condition Evaluation, Jan. 27, 2000 (Year: 2020).*

(Continued)

*Primary Examiner* — Michael J Dalbo
*Assistant Examiner* — Denise R Karavias
(74) *Attorney, Agent, or Firm* — Whitmyer IP Group LLC (57) ABSTRACT

A mechanism and method for deciding whether a bearing is faulty or not. The method is performed by a controller. The method includes obtaining a signal representing vibrations of the bearing. The vibrations are obtained during operation of the bearing. The method includes applying signal segmentation to the signal in at least two frequency bands in (Continued)

order to identify any shock pulse in the signal. The method includes deciding whether the bearing is faulty or not depending on whether or not the signal has any shock pulse.

23 Claims, 5 Drawing Sheets

(56) References Cited

U.S. PATENT DOCUMENTS

| | | | | |
|---|---|---|---|---|
| 5,852,793 | A * | 12/1998 | Board | G01H 1/003 |
| | | | | 702/56 |
| 7,640,139 | B2 * | 12/2009 | Sahara | G01H 1/003 |
| | | | | 702/182 |
| 7,813,906 | B2 * | 10/2010 | Shiromaru | G01H 1/003 |
| | | | | 703/7 |
| 7,983,490 | B1 * | 7/2011 | Minter | G06K 9/6226 |
| | | | | 706/12 |
| 8,285,498 | B2 * | 10/2012 | Saarinen | G01M 13/045 |
| | | | | 702/56 |
| 9,845,012 | B2 * | 12/2017 | Lu | B60L 3/0061 |
| 2008/0234964 | A1 * | 9/2008 | Miyasaka | F16C 19/527 |
| | | | | 702/113 |
| 2011/0041611 | A1 | 2/2011 | Hofer et al. | |
| 2013/0024164 | A1 * | 1/2013 | Paajarvi | G01M 13/045 |
| | | | | 702/194 |
| 2013/0116936 | A1 | 5/2013 | Yamamoto | |
| 2015/0032389 | A1 * | 1/2015 | Hedin | G01M 13/045 |
| | | | | 702/34 |
| 2017/0322114 | A1 * | 11/2017 | Ide | G05B 23/024 |
| 2017/0337812 | A1 * | 11/2017 | Mori | G08G 1/0141 |

FOREIGN PATENT DOCUMENTS

| | | |
|---|---|---|
| CN | 103969069 A | 8/2014 |
| EP | 2053375 A1 | 4/2009 |
| EP | 3309530 A1 | 4/2018 |
| WO | 0004361 A1 | 1/2000 |

OTHER PUBLICATIONS

Espace. Net machine translation EP 2053375 B1 Saarinen, A Method for Detection and Automatic Identification of Damage to Rolling Bearings, Dec. 30, 2009 (Year: 2020).*
IP.com machine translation JP 5469948 B2, Test Equipment for Slewing Ring Bearings, Apr. 16, 2014 (Year: 2020).*
Dictionary of Statistical Terms, 5th edition, prepared for International Statistical Institute by F.H.C. Marriott. Published for International Statistical Institute by Longman Scientific and Technical, May 21, 2002, downloaded from https://stats.oecd.org/glossary/detail.asp?ID=3714 on Jul. 1, 2021 (Year: 2002).*
Weijs et al., Kullback-Leibler "Divergence as a Forecast Skill Score with Classic Reliability—Resolution-Uncertainty Decomposition," Sep. 1, 2010, AMS Journals, 3387-3399 downloaded from https://journals.ametsoc.org/view/journals/mwre/138/9/2010mwr3229.1.xml on Mar. 23, 2022 (Year: 2010).*
Chinese Office Action; Application No. 2017/800621687; dated Jul. 3, 2020; 18 Pages.
Ian Howard: "A Review of Rolling Element Bearing Vibration Detections Diagnosis and Prognosis", No. DSTO-RR-0013, Oct. 31, 1994, Melbourne, Australia URL:http://www.dtic.mil/get-tr-doc/pdf? Retrieved from the Internet on Mar. 20, 2017.
International Preliminary Report on Patentability Application No. PCT/EP2017/075514 Completed: Nov. 27, 2018 28 Pages.
International Search Report & Writteon Opinion of the International Searching Authority Application No. PCT/EP2017/075514 Completed: Dec. 18, 2017; dated Jan. 24, 2018 17 Pages.
Written Opinion of the International Preliminary Examining Authority Application No. PCT/EP2017/075514 Completed: Aug. 31, 2018 7 Pages.
Chinese Rejection Decision with Summary; Application No. 201780062168.7; dated Jun. 23, 2021; 15 Pages.

* cited by examiner

Fig. 1

(a): Interval with shock pulse and noise
(b): Interval with only noise

DECISION OF FAULTY BEARING

TECHNICAL FIELD

Embodiments presented herein relate to a method, a controller, a computer program, and a computer program product for deciding whether a bearing is faulty or not.

BACKGROUND

In general terms, a rolling-element bearing (REB), also known as a rolling bearing, is a bearing which carries a load by placing rolling elements (such as balls or rollers) between two bearing rings called races. The relative motion of the races cause the rolling elements to roll with very little rolling resistance and with little sliding.

In general terms, REBs are common elements in various rotating machines and the failure of bearing is a common reason for machine breakdowns. Economical losses due to an unexpected failure of a critical bearing can be significantly reduced by applying a proper maintenance strategy. When using condition based maintenance it could be possible to detect incipient faults so early that it is possible to perform maintenance actions before the bearing fails. Early fault detection could be even more important in applications where there are planned maintenance breaks at regular intervals since the probability that the REB can be replaced without any additional stoppages increases with earlier detection.

In the early stage, the local fault in bearing element produces a series of weak impacts at a rate dependent on bearing geometry. These impacts in turn excite a special type of vibration that is, in principle, possible to detect using various condition monitoring methods.

In many cases the vibration signal measured for condition monitoring includes noise and periodical components from other vibrating components making the analysis challenging, especially, when the goal is early fault detection. For example, commonly used envelope analysis is not working properly in these conditions and early shock pulse detection, as disclosed in EP 2053375 B1, is in some aspects not able to detect the fault early enough.

Hence, there is still a need for efficient detection of faulty bearings.

SUMMARY

An object of embodiments herein is to provide efficient detection of faulty bearings.

According to a first aspect there is presented a method for deciding whether a bearing is faulty or not. The method is performed by a controller. The method comprises obtaining a signal representing vibrations of the bearing. The vibrations are obtained during operation of the bearing. The method comprises applying signal segmentation to the signal in at least two frequency bands in order to identify any shock pulse in the signal. The method comprises deciding whether the bearing is faulty or not depending on whether or not the signal comprises said any shock pulse.

According to a second aspect there is presented a controller for deciding whether a bearing is faulty or not. The controller comprises processing circuitry. The processing circuitry is configured to cause the controller to obtain a signal representing vibrations of the bearing. The vibrations are obtained during operation of the bearing. The processing circuitry is configured to cause the controller to apply signal segmentation to the signal in at least two frequency bands in order to identify any shock pulse in the signal. The processing circuitry is configured to cause the controller to decide whether the bearing is faulty or not depending on whether or not the signal comprises said any shock pulse.

According to a third aspect there is presented a controller for deciding whether a bearing is faulty or not. The controller comprises processing circuitry and a storage medium. The storage medium stores instructions that, when executed by the processing circuitry, causes the controller to perform operations, or steps. The operations, or steps, cause the controller to obtain operational conditions of the bearing. The operations, or steps, cause the controller to obtain a signal representing vibrations of the bearing. The vibrations are obtained during operation of the bearing. The operations, or steps, cause the controller to apply signal segmentation to the signal in at least two frequency bands in order to identify any shock pulse in the signal. The operations, or steps, cause the controller to decide whether the bearing is faulty or not depending on whether or not the signal comprises said any shock pulse.

According to a fourth aspect there is presented a controller for deciding whether a bearing is faulty or not. The controller comprises an obtain module configured to obtain a signal representing vibrations of the bearing. The vibrations are obtained during operation of the bearing. The controller comprises an apply module configured to apply signal segmentation to the signal in at least two frequency bands in order to identify any shock pulse in the signal. The controller comprise a decide module configured to cause the controller to decide whether the bearing is faulty or not depending on whether or not the signal comprises said any shock pulse.

Advantageously this method and this controller provide efficient detection of faulty bearings.

Advantageously this method and this controller are able to detect the bearing fault 2-4 months earlier than the previously mentioned method in EP 2053375 B1.

Advantageously this method and this controller are able to detect bearing faults that cannot be detected using the previously mentioned method in EP 2053375 B1.

Advantageously, due to early fault detection, also the actions to prolong the remaining useful life of the bearing can be started earlier, which results in longer life and smaller effects on operation conditions.

According to a fifth aspect there is presented a computer program for deciding whether a bearing is faulty or not, the computer program comprising computer program code which, when run on a controller, causes the controller to perform a method according to the first aspect.

According to a sixth aspect there is presented a computer program product comprising a computer program according to the fifth aspect and a computer readable storage medium on which the computer program is stored. The computer readable storage medium could be a non-transitory computer readable storage medium.

It is to be noted that any feature of the first, second, third, fourth, fifth and sixth aspects may be applied to any other aspect, wherever appropriate. Likewise, any advantage of the first aspect may equally apply to the second, third, fourth, fifth and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
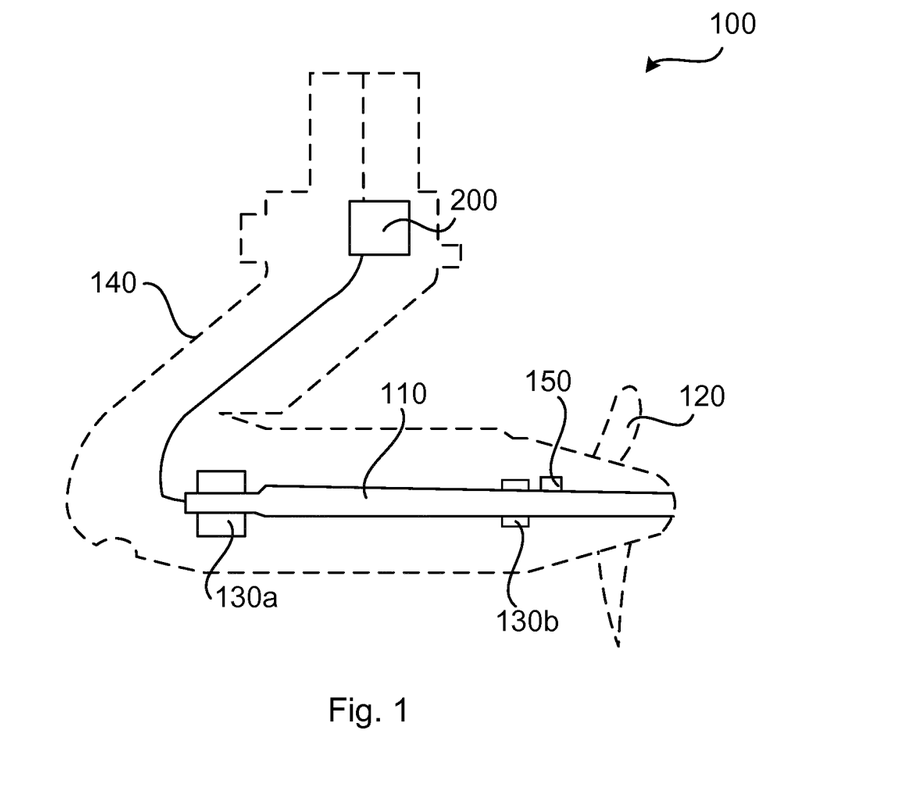
FIG. 1 schematically illustrates bearings provided in an azimuth thruster according to an embodiment.

FIG. 1 is a schematic illustration of an azimuth thruster 100 according to an embodiment. The azimuth thruster 100 is an electric podded azimuth thruster 100 and comprises a propeller shaft no on which propeller blades 120 are provided. The propeller shaft no is supported by at least one bearing 130a, 130b. The interior of the azimuth thruster 100 is enclosed by a water-tight casing, or hull, 140. A controller 200 is provided for predicting remaining useful lifetime of the bearing 130a, 130b and obtains operational conditions of the bearing 130a, 130b as provided by sensors 150.

The embodiments disclosed herein relate to mechanisms for deciding whether the bearing 130a, 130b is faulty or not. In order to obtain such mechanisms there is provided a controller 200, a method performed by the controller 200, a computer program product comprising code, for example in the form of a computer program, that when run on a controller 200, causes the controller 200 to perform the method.

Figure 2:
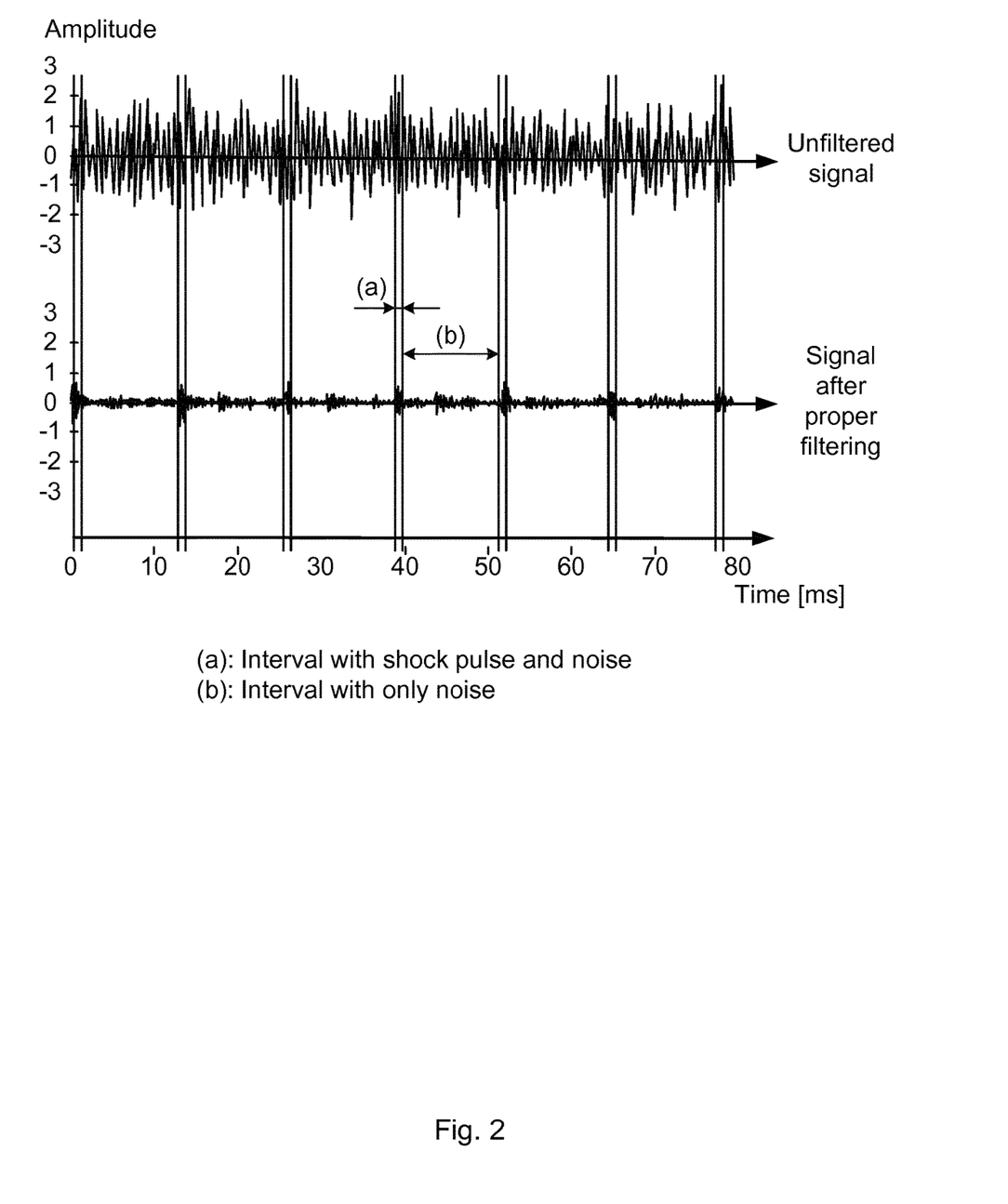
FIG. 2 schematically illustrates data sequences of a vibration signal according to an embodiment.

FIG. 2 schematically illustrates an 80 ms sample of a vibration signal (hereinafter simply referred to as "signal") measured from a bearing 130a, 130b with a small outer race fault. In general terms, reliable bearing fault detection aims at detecting small fault pulses (hereinafter denoted shock pulses) in the signal as soon as the pulses appear with high probability and at the same time keeping the number of false alarms small. The top portion of FIG. 2 illustrates that these slow energy shock pulses are totally masked by noise in the raw measured signal. The bottom portion of FIG. 2 illustrates that the low energy shock pulses can be discovered after proper filtering. It is clear that the more the noise can be removed, the easier and more reliable the fault detection is. In general terms, from shock pulse detection point of view, every signal component other than those representing shock pulses should be classified as noise. In general terms, in the frequency domain most of the energy of the fault pulses is in the natural frequency bands of the bearing elements and therefore the signal-to-noise ratio (SNR) may be also better in these frequency bands. Succeeding in the early fault detection depends greatly on how well the noise can be removed by filtering and how accurately the optimum frequency band can be found. In the time domain the best SNRs are in short data sequences that contain the shock pulses.

Figure 3:
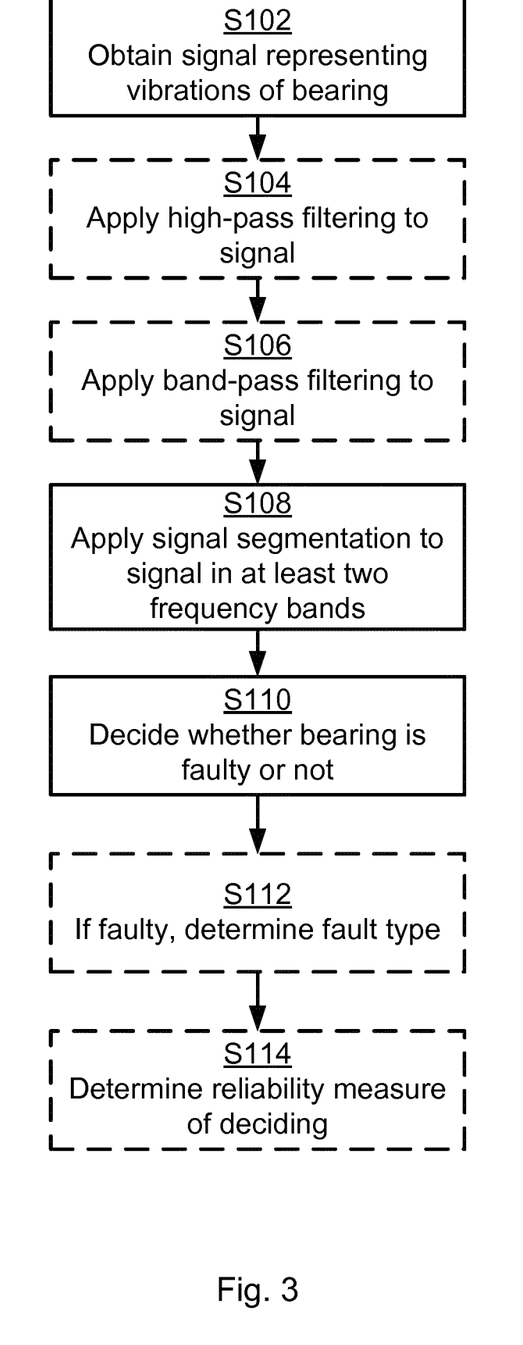
FIG. 3 is a flowchart of methods according to embodiments.

FIG. 3 is a flowchart illustrating embodiments of methods for deciding whether the bearing 130a, 130b is faulty or not. The methods are performed by the controller 200. The methods are advantageously provided as computer programs 320.

A signal representing vibrations of the bearing is received. Hence, the controller is configured to perform step S102:

S102: The controller 200 obtains a signal representing vibrations of the bearing 130a, 130b. The vibrations are obtained during operation of the bearing 130a, 130b. Optionally, digital filtering is applied to the signal.

The signal is split into at least two frequency bands. Hence, the controller is configured to perform step S108:

S108: The controller 200 applies signal segmentation to the signal in at least two frequency bands in order to identify any shock pulse in the signal.

In general there could be a plurality of frequency bands in which signal segmentation is applied to the signal. In practice there could be in the order of up to 200 such frequency bands. Signal segmentation is applied in order to identify any shock pulse in the signal. Hence, the controller is configured to perform step S110:

S110: The controller 200 decides whether the bearing 130a, 130b is faulty or not depending on whether or not the signal comprises such any shock pulse.

In summary, there is disclosed a method that, in at least two frequency bands and using signal segmentation, searches for shock pulses caused by a fault in the bearing 130a, 130b. A decision making algorithm is then used to decide if any shock pulses are present or not and hence if the bearing 130a, 130b is faulty or not.

Embodiments relating to further details of deciding whether a bearing 130a, 130b is faulty or not as performed by the controller 200 will now be disclosed.

In some aspects, and as will be further disclosed below, the signal is high-pass filtered. Hence, according to an embodiment the controller 200 is configured to perform step S104:

S104: The controller 200 applies high-pass filtering to the signal before applying the signal segmentation. That is, step S104 is performed before step S108 is performed.

There could be different ways to select the cut-off frequency of the high-pass filter. As will be further disclosed below, natural frequencies of the bearing components that a fault may excite appear typically in the relative higher frequency range (such as above 1 kHz). Therefore, according to an embodiment the high-pass filtering has a cut-off frequency of at least 1 kHz, preferably between 1 kHz and 2 kHz, and more preferably around 1.5 kHz. Further implementation details of the high-pass filtering will be provided below.

In some aspects, and as will be further disclosed below, the signal is band-pass filtered. Hence, according to an embodiment the controller 200 is configured to perform step S106:

S106: The controller 200 applies band-pass filtering to the signal so as to split the signal into the at least two frequency bands. That is, there are as many band-pass filters as there are frequency bands into which the signal is split, where each of the band-pass filters has its own center frequency.

There could be different ways to determine the filter coefficients of the band-pass filter used when applying the band-pass filtering. According to an embodiment, and as will be further disclosed below, the band-pass filtering uses filter coefficients determined from eigenvalues and eigenvectors of an autocorrelation matrix of the signal. As will be further described below, the band-pass filtering might be regarded as filtering the signal with eigenfilters. The band-pass filtering thereby divides the signal into orthogonal sequences. That is, the output from any of the band-pass filters is orthogonal to the output from any of the other band-pass filters.

The band-pass filtering in step S106 is generally applied to the signal after the high-pass filtering has been applied in step S104. That is, the band-pass filtering is applied to the already high-pass filtered signal but before the signal segmentation in step S108. Further implementation details of the band-pass filtering will be provided below In some aspects, the signal segmentation comprises using two sliding windows in each of the at least two frequency bands; a reference window and a test window. In some aspects the reference window is longer than the test window. Further implementation details of the reference window and the test window as well as how they might be used during the signal segmentation will be further disclosed below.

As mentioned with reference to FIG. 2, it might be assumed that the signal comprises noise in addition to any possible shock pulse. In some aspects the deciding in step S110 therefore comprises estimating a repetition frequency of the shock pulse and then deciding if the amplitude at the repetition frequency differentiates from the noise in the signal. Further implementation details of how to estimate the repetition frequency will be provided below.

As disclosed above, signal segmentation is applied to the signal in each frequency band. According to an embodiment, the signal is, in each frequency band, analyzed in the time domain.

In general, each shock pulse is caused by a fault in the bearing 130a, 130b. Hence, according to an embodiment the bearing 130a, 130b is decided as faulty when at least one shock pulse is identified in at least one of the frequency bands of the signal.

Not only a decision as such regarding whether the bearing is faulty or not can be made. If a fault is detected, also the type of the fault could be determined. Hence, according to an embodiment the controller 200 is configured to perform step S112:

S112: The controller 200 determines, when it has been decided that the bearing is faulty, fault type of the fault. Examples of faulty types that could be determined are Ball Pass Frequency Inner (BPFI), Ball Pass Frequency Outer (BPFO), and Ball Spin Frequency (BSF).

Further, also a reliability measure of the deciding can be determined. Hence, according to an embodiment the controller 200 is configured to perform step S114:

S114: The controller 200 determines a reliability measure of the deciding. According to an embodiment, the reliability measure is dependent on in how many of the frequency bands any shock pulse(s) has been identified. According to a further embodiment, the reliability measure is dependent on a magnitude of any identified shock pulse(s).

There may be different types of bearings 130a, 130b. According to an embodiment the bearing 130a, 130b is a rolling-element bearing. With reference to the illustrative example of FIG. 1, the bearing 130a, 130b could be part of an electric podded azimuth thruster 100.

Figure 4:
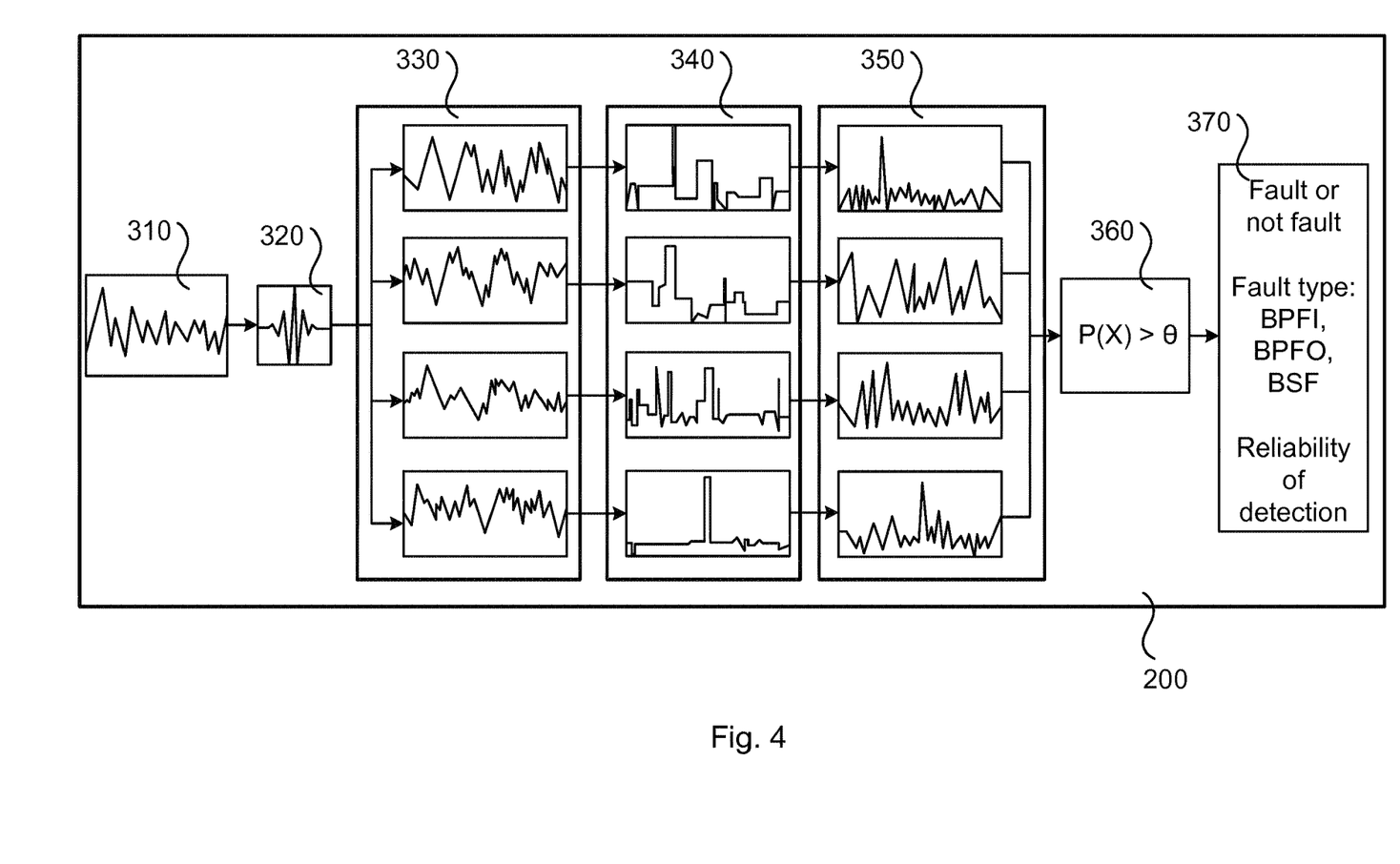
FIG. 4 is a schematic diagram of showing functional blocks of a controller according to an embodiment.

FIG. 4 is a schematic diagram of showing functional blocks of the bearing fault decision making mechanism of the controller 200 according to an embodiment. A signal obtaining block 310 is configured to obtain a signal representing vibrations of the bearing 130a, 130b. An optional digital filtering block 320 is configured to remove low-frequency noise from the signal. A frequency band splitting block 330 is configured to adaptively divide the signal in up to 200 frequency bands. A signal segmentation block 340 is configured to search for impulses excited by any fault in each of the frequency bands using signal segmentation in the time domain. A fault indicator calculation block 350 is configured to calculate a fault indicator for each frequency band using segmentation results and assumed bearing fault frequencies. A decision making block 360 is configured to decide if any shock pulses generated by the fault are present or not. An optional further signal processing block 370 is configured to determine faulty type and/or determine a reliability measure. In what follows, these blocks are described in more detail.

Signal Obtaining Block 310

The signal obtaining block is configured to obtain a signal representing vibrations of the bearing 130a, 130b during operation of the bearing 130a, 130b. Hence, the signal obtaining block is configured to implement at least part of step S102.

Digital Filtering Block 320

In general terms, high-pass filtering is used to remove low-frequency disturbances. In the case of strong impulsive noise filtering, for example, based on wavelets could be used for noise removal. Different types of modelling techniques may be used for noise removal depending on whether the source and frequency of the noise are known or not. Hence, the digital filtering block is configured to implement at least part of step S104.

As mentioned above, natural frequencies of the bearing components that a fault may excite appear typically in comparatively higher frequency ranges, such as above 1 kHz. In some examples the cut-off frequency of the high-pass filter is therefore set to around 1.5 kHz. Therefore, frequencies below that frequency range might be considered to contain only noise from the shock pulse detection perspective. One purpose of the digital high-pass filtering as performed by the digital filtering block is therefore to remove low-frequency disturbances from the signal. In the case of strong impulsive noise, for example, high-pass filtering based on wavelets might be used for the noise removal. In addition, if the source and frequency of the noise is known, many types of modelling techniques may be used for noise removal. Low frequency noise can thus be removed by high-pass filtering. Any remaining noise might then be separated from the high-pass filtered signal using a large number of adaptive band-pass filters. The optimum SNR will be in one of the band-pass filtered signal.

Frequency Band Splitting Block 330

The signal is by the frequency band splitting block split into at least two frequency bands. In the illustrative example of FIG. 3 the signal is split into four frequency bands. Eigenvectors of the autocorrelation matrix are used as coefficients of band-pass finite impulse response (FIR) filters. The frequency band splitting block finds the coefficients so that the variance of the signal in the first frequency band is the largest compared to all possible linear FIR filters of the same length. The variance of the signal in the second frequency band is the second largest compared against all possible linear FIR filters of the same length, but the filter calculated using the first eigenvector. In addition, the signals in the first and second frequency bands are orthogonal. Properties of the signals in the rest of the frequency bands follow the same principles. The filtering by the frequency band splitting block thereby divides the signal due to bearing fault and other signals into different frequency bands and maximizes the SNR in one of the frequency bands. Hence, the frequency band splitting block is configured to implement at least part of step S106.

In further detail, a commonly used simple model for a short living pulse generated by a bearing fault is a modulated single sinusoid:

$$x(t) = A^{-\beta t} \cos(\omega_{res} t) + n, \quad (1)$$

where $\omega_{res}$ is the resonance frequency excited by the impact, and n represents noise. There are generally multiple resonance frequencies, but assuming that the band $\omega_{res}$ is the best one for the analysis, the model according to Equation (1) is good enough when describing the problem. In order to maximize SNR, a band-pass filter is designed with $\omega_{res}$ as a center frequency. However, the exact resonance frequency might rarely be known in advance.

Eigenvalue decomposition of the autocorrelation matrix of x(t) might be used to improve the SNR in the frequency estimation. Eigenvectors of the autocorrelation matrix span the signal subspace and the noise subspace. Noise subspace eigenvectors of the autocorrelation matrix are orthogonal to the signal eigenvectors, or any combination of the signal eigenvectors. Let the $N_B \times N_B$ estimate for the auto-covariance matrix $\hat{R}_{xx}$ be defined as follows:

$$\hat{R}_{xx} = \begin{bmatrix} \hat{r}_{xx}[0] & \hat{r}_{xx}[1] & \ldots & \hat{r}_{xx}[N_B - 1] \\ \hat{r}_{xx}[1] & \hat{r}_{xx}[0] & \ldots & \hat{r}_{xx}[N_B - 2] \\ \ldots & \ldots & \ldots & \ldots \\ \hat{r}_{xx}[N_B - 1] & \hat{r}_{xx}[N_B - 2] & \ldots & \hat{r}_{xx}[0] \end{bmatrix} \quad (2)$$

where $\hat{r}_{xx}[m]$ is the biased estimate for autocorrelation sequence:

$$\hat{r}_{xx}[m] = \frac{1}{N - N_B} \sum_{k=1}^{N} x[k] x[k + m], \quad (3)$$

$$m = 0, 1, 2, \ldots, N_B - 1.$$

and $x[k]$, $k=1, \ldots N$ is the high-pass filtered signal.

Eigenvalues $\tau_r[n]$ and eigenvectors U could then be determined by singular value decomposition:

$$\hat{R}_{xx} = V \sum U^T, \quad (4)$$

$$\sum = \begin{bmatrix} \tau[1] & 0 & \ldots & 0 \\ 0 & \tau[2] & \ldots & 0 \\ \vdots & \vdots & \ddots & \vdots \\ 0 & 0 & \ldots & \tau[N_B] \end{bmatrix},$$

$$\tau[1] \geq \tau[2] \geq, \ldots, \geq \tau[N_B].$$

The same eigenvectors of $R_{xx}$ can be determined by an eigenfilter method, which illustrates their properties from a different point of view. The eigenvectors of $R_{xx}$ can be obtained in the process of finding a solution to the following maximization problem. Let y[n] be the filtered signal defined as follows:

$$y[n] = \sum_{k=0}^{N_B} b[k] x[n - k]. \quad (5)$$

The energy of y[n] can be written as:

$$E = \sum_{n=-\infty}^{\infty} y^2[n] = b^T R_{xx} b, \quad (6)$$

where $b^T = b[0], b[1], \ldots, b[N_B]$ are the filter coefficients defined such that:

$$b^T b = \sum_{k=0}^{N_B} b^2[k] = 1, \quad (7)$$

It can be shown that the filter coefficients b that maximize the energy in Equation (6) with the constraint according to Equation (7) equal the first eigenvector $b[k]=U[1,k]$, $k=1, \ldots, N_B$ of the autocorrelation matrix $R_{xx}$. This process can be continued to find the coefficients of the linear filter that maximizes the remaining energy. It turns out that these coefficients equal the second eigenvector of $R_{xx}$. Similarly, using the third eigenvector of $R_{xx}$ as coefficients of the filter maximizes the remaining energy of the signal after it has been filtered with the filter with second eigenvector as coefficients, etc. All the signals filtered by the eigenfilters are orthogonal to each other.

The eigenvectors of the autocorrelation matrix might be used as coefficients of band-pass FIR filters in the following way. The i:th band-pass filtered sequence is determined according to:

$$y^i[n] = \sum_{k=1}^{N_B+1} x[n + k - 1] U[i, k], n = 1, 2, \ldots, N - N_B. \quad (8)$$

In the case of a bearing fault, this filtering maximizes the SNR by dividing the signal into orthogonal sequences such that in one of the band-pass filtered sequence the signal due to bearing fault is strongest compared to filtered noise and in the other bands the data sequences comprise mostly noise.

Predefined band-pass filters or wavelets used in other bearing fault detection mechanisms do not have this property.

Signal Segmentation Block 340

In general terms, detection of transients might be considered also as a segmentation problem. In general terms, the segmentation of signals refers to the automatic decomposition of a given signal into stationary, or weakly nonstationary, segments, the length of which is adapted to the local properties of the signal. The so-called change detection methodology provides preferential tools for such an automatic segmentation, which can be achieved either on-line or off-line. In this situation, the problem of interest is the detection of the changes in the local characteristics, and the estimation of the places, in time, where the changes occur.

A local fault in bearing 130a, 130b would produce a series of weak impacts at a rate dependent on bearing geometry. These impacts in turn excite a special type of vibration; short living pulses. At the early stage of the fault, the length of the pulses is much shorter than the period between two consecutive pulses. Thus the signal consists of sequences containing a pulse due to a fault plus noise and sequences containing only noise. The signal segmentation block is configured to find the starting and end points of these pulses. In addition, the signal segmentation block is configured to create a signal that estimates the probabilities of samples belonging to the pulse segment. Since it is not known beforehand in which of the frequency band(s) the SNR is the best, the segmentation is performed for each of the frequency bands. Hence, the signal segmentation block is configured to implement at least part of step S108.

In further detail, at the early stage of the fault, lengths of the weak pulses excited by the bearing fault are generally much shorter than the period between two consecutive pulses and the data sequences between the pulses contain only noise. This could be utilized during time domain segmentation, which general purpose is to estimate the probability of occurrence of the fault pulse at each consecutive and overlapping segments when scanning through the band-pass filtered signals. The procedure might be repeated for each of the band-pass filtered signals.

A sliding window set-up for change detection is defined as follows:

$$\underbrace{y[1], y[2], \ldots, y[k-K]}_{\text{Model } P_{\theta_0}}, \underbrace{y[k-K+1], y[K-L+2], \ldots, y[k]}_{\text{Model } P_{\theta_1}}. \quad (9)$$

A model "1" based on data from sliding window size K is compared to a model "o" based on all past data from a larger sliding window. The change point is found by sliding the window and testing if the parameter vectors $\theta_0$ and $\theta_1$ are significantly different. In order to apply this approach a model, a distance measure to measure the difference between the models, and relevant test statistics are generally needed.

The sliding window approach used here for shock pulse detection is a modification of the general method presented above with reference to Equation (9). The L samples long band-pass filtered signal in the sliding window of band i, denoted $y^i[l]=\lfloor y^i[l], y^i[l+1], \ldots, y^i[l+L] \rfloor$, $l=1,2,\ldots,N-L1$, is split into two windows:

1. $y^i_r[k]=\lfloor y^i[k-K_r], y^i[k-K_r+1], \ldots, y^i[k-1] \rfloor$ is called the reference window and
2. $y^i_t[k]=\lfloor y^i[k], y^i[k+1], \ldots, y^i[k+K_t-1] \rfloor$ is called the test window.

The length of the reference window, denoted L, is slightly shorter than the time difference between two consecutive shock pulses generated by the fault, and the length of the test window, denoted $K_t$, is about the length of the shock pulse at the early fault stage. $K_r$ is the length of the reference window defined as $K_r=L-K_t$. It could be assumed that between the shock pulses the data follows the Model $\theta_0$ whereas the actual shock pulse data follows the Model $\theta_1$.

Two hypotheses $H_0$ and $H_1$ are defined as follows:

$H_0$: there is no shock pulse in the test window $y_t^i[k]$ and the data in whole sequence $y^i[l]$ follows the Model $P_{\theta_0}$ (10a)

$H_1$: the data in the reference window $y_r^i[k]$ follows the Model $P_{\theta_0}$ and there is a shock pulse in the test window $y_t^i[k]$ following the Model $P_{\theta_1}$. (10b)

The hypothesis-model combination is then given as:

$$\underbrace{y^i[k-K_r], y^i[k-K_r+1], \ldots, y^i[k-1]}_{H_1:y_r^i|\text{Model } P_{\theta_0}}, \underbrace{y^i[k], y^i[k+1], \ldots, y^i[k+K_t-1]}_{H_1:y_t^i|\text{Model } P_{\theta_1}} \quad (11)$$

$$H_0: y^i|\text{Model } P_{\theta_0}$$

Models, distance measurement, and test statistics needed for applying the method are discussed below.

Distribution models comprising information about the amplitude behavior of the signal are considered. Even though information contained in ordering may be lost, this is a valid approach since the effects of the fault appear as changes in amplitude. Previously, for example, parametric models like normal distribution and Nakagami distribution have been used for signal detection in radar and cognitive radio applications. However, non-parametric distribution estimates are used herein, which are valid for all kind of distributions.

Kernel based methods are common non-parametric estimators for distributions. Kernel based methods can uncover structural features in the data which a parametric approach might not reveal. The density estimates are given by:

$$\hat{p}_r^i(y, k) = \frac{1}{K_r} \sum_{n=k-K_r}^{k} K_h(y^i[n] - y), \quad (12)$$

$$\hat{p}_t^i(y, k) = \frac{1}{K_r} \sum_{n=k}^{k+K_t} K_h(y^i[n] - y),$$

for the reference and test sequences, respectively. The function $K_h(x)$ is a kernel function, satisfying $K_h(\cdot) \geq 0$ and that integrates to 1. The resulting estimate is known as a kernel density estimate. The bandwidth parameter h controls the smoothness of the resulting estimate, increasing the smoothness for larger values of h.

Norms exist for measuring the difference between two probability density functions (PDFs). One example as used herein is, the Kullback-Leibler divergence (KLD) defined as:

$$D_{KL}^i[k] = \int_{-\infty}^{\infty} \hat{p}_t(y, k) \ln\left(\frac{\hat{p}_t(y, k)}{\hat{p}_r(y, k)}\right) dy. \quad (1)$$

Instead of the KLD value as such it might be beneficial to estimate the probability that there is a shock pulse in the test sequence using KLD and a logistics function defined as:

$$\hat{p}_{SP}^i[k] = 1/(1 + \exp(-\beta_0 - \beta_1 D_{KL}^i[k])). \quad (14)$$

The parameters $\beta_0$ and $\beta_1$ can be determined using data or theoretical distribution models.

Fault Indicator Calculation Block 350

In spite of all the filtering, there may be pulses in the band-pass filtered signals which are not generated by bearing faults. The signal segmentation block finds also these pulses. The fault indicator calculation block is therefore configured to decide if the frequency of the pulses is compatible with any of the bearing fault frequencies and if the probability that the pulses are just noise is small enough. For the decision, a fault indicator is calculated by the fault indicator calculation block. The fault indicator is based on a likelihood function, which is calculated by the fault indicator calculation block using the probabilities of samples belonging to the pulse segments (output from the signal segmentation block). The maximum of this likelihood is at the frequency that corresponds the most common time period between two consecutive pulses. The value of the likelihood function at this frequency is by the fault indicator calculation block compared to the value of the likelihood function for noise only. The frequency at which the likelihood has maximum value is by the fault indicator calculation block compared to the bearing fault frequencies. The fault indicator is a ratio of the maximum of the likelihood function and noise level multiplied by the probability that the detected fault frequency is correct. A fault indicator is calculated for each of the frequency bands and maximum value is by the fault indicator calculation block selected as output. Hence, the fault indicator calculation block is configured to implement at least part of step S108.

In further detail, there could be many sources of vibration that are not related to bearing faults, but have effects on the amplitudes and frequencies of the signal measured at the bearing housing. Some of the disturbances may appear as random pulses in the resonance frequency bands of the bearing components. Thus it is might not enough to detect whether there are shock pulses or not in the measured signal. When the rotation speed of the monitored machine is constant, the weak pulses due to bearing fault generally have a constant repetition frequency which can calculated based on the known geometry of the bearing and the fault type. The fault types are the inner race fault, the outer race fault, and the rolling element fault. Corresponding fault frequencies are often called the inner race fault frequency, the outer race fault frequency, and the rolling element fault frequency. A decision might therefore be made as to whether the repetition frequency of the detected pulses matches any of the fault frequencies or not. This can be accomplished by estimating the repetition frequency and then deciding if the amplitude at the repetition frequency differentiates significantly from noise.

It could be beneficial to use time-domain maximum likelihood frequency estimation (MLE) which is not restricted by a pre-defined frequency grid and does not depend on the length of the sample (such as methods based on the fast Fourier transform). More formally, the fault frequency might be estimated by searching the frequencies $f_{ff}^i$, amplitudes $B_k^i$, and phases $\phi_k^i$, that maximizes the likelihood of a sinusoidal model calculated for the probabilities $\hat{p}_{SP}^i[k]$ defined as:

$$\hat{p}_{SP}^i[k] = \sum_{m=1}^{M} B_k^i \sin(m 2\pi f_{ff}^i k + \phi_k^i) + \sigma^i[k], \quad (15)$$

$$k = 0, 1, 2, \ldots, N,$$

in a frequency range $f_{ff}^i \in [f_{min}, f_{max}]$. The boundaries of the defined fault frequency range $f_{min}$, $f_{max}$ should be chosen such that the frequencies of known disturbances are excluded.

In order to estimate whether the amplitude at the fault frequency is significantly different than the amplitudes of random noise or not, the noise level might be estimated. For this purpose the median of amplitudes calculated by Blackman-Tukey spectral estimation method:

$$P_{BT}^i(f) = \sum_{k=-(N-1)}^{N-1} w[k] r_{\hat{p}_{SP}^i, \hat{p}_{SP}^i}[k] \exp(-j2\pi f k), \quad (16)$$

Where $r_{\hat{p}_{SP}^i, \hat{p}_{SP}^i}$ is the biased autocorrelation sequence of $\hat{p}_{SP}^i[k]$ and $w[k]$ is the lag window is used. The fault indicator, denoted FI, is then the maximum of ratios calculated for the each band-pass filtered sequences:

$$FI = \max_{i=1,\ldots,N_B} \left\{ \frac{B_1^i}{\text{median}\{P_{BT}^i(f)\}} \right\}, \quad (17)$$

and it is calculated for all bearing fault types.

Decision Making Block 360

Based on the fault indicator value or consecutive values the decision making block is configured to decide whether the signal is measured from a faulty bearing 130a, 130b or not. Combination of change detection methods such as a threshold, cumulative sum control chart (CUSUM), or Bayesian change detection could be used by the decision making block for this purpose. The output from the decision making block is thus a decision indicating whether the bearing 130a, 130b is faulty or not faulty. Hence, the decision making block is configured to implement at least part of step S110.

Further Signal Processing Block 370

The further signal processing block is configured to determine faulty type (assuming that the decision making block has indicated that the bearing 130a, 130b is faulty) and/or determine a reliability measure of the decision made by the decision making block. The further signal processing block is configured to implement any of steps S112 and S114 above.

In further detail, the final decision if there are shock pulses generated by the fault in the obtained signal might be performed based on fault indicator values.

Assume again that the task is to choose between two hypotheses $H_0$: the bearing is healthy (i.e., not faulty), and $H_1$: the bearing is faulty, where the choice is made using a sequence of fault indicator values (FI[1],FI[2],FI[3], . . . ). Note that each value FI[n] is a scalar variable characterizing the bearing condition at discrete time n, and not an element of a multivariate vector FI. The likelihood ratio $\Lambda_m$ based on m consecutive observations is defined according to:

$$\Lambda_m = \frac{P(FI[i], FI[i-1], \ldots, FI[i-m+1]H_1)}{P(FI[i], FI[i-1], \ldots, FI[i-m+1]H_0)}. \quad (18)$$

In Equation (18), $P(\bullet, \ldots, \bullet|H_k)$, k=0,1 are the probability densities under $H_0$ and $H_1$ based on m observations.

Wald's sequential probability ratio test (SPRT) is defined as follows. Choose and fix two constants A and B such that $0<B<1<A<\infty$. Observe random variables FI[n] one after each other. At each stage compute the likelihood ratio. At the m:th stage:

if $\Lambda_m \leq B$ accept $H_0$ and initialize the test, (19a)

if $\Lambda_m \geq A$ accept $H_1$ and raise an alarm, (19b)

otherwise take another sample.

As in binary decision theory two kinds of errors arise: the probability $\alpha$ of false alarms, and the probability $\beta$ of accepting $H_0$ when $H_1$ is true (probability of missed alarms). The probability of detection is $1-\beta$.

For Gaussian data implementation of the SPRT is simple:
Step 0. Initialization.
Estimate the mean value $\mu_0$ and standard deviation $\sigma$ of the fault indicator values from the learning period when there are no bearing faults.

Decide the mean value $\mu_1$ for the friction indicator that the algorithm should detect ($\mu_1 > \mu_0$) and the probabilities $\alpha$ and $\beta$.

Calculate the limits $$a = \ln\left(\frac{1-\beta}{\alpha}\right), b = \ln\left(\frac{\beta}{1-\alpha}\right).$$

Set m=0;

Step 1. Calculate the logarithmic probability ratio

Set m:=m+1;

Calculate the logarithmic probability ratio:

$$\Theta_m = \frac{\mu_1 - \mu_0}{2\sigma}\left[2\sum_{i=1}^{m} FI[n-i+1] - m(\mu_1 + \mu_0)\right]$$

Step 2. Compare the logarithmic probability ratio against the limits;
if $\Theta_m \leq b$, accept $H_0$ and set m=0 and go to Step 1, else
if $\Theta_m \geq a$, accept $H_1$ and raise an alarm, and
otherwise go to Step 1.

Fault indicator values calculated for all bearing fault types could then be monitored using this procedure.

Figure 5:
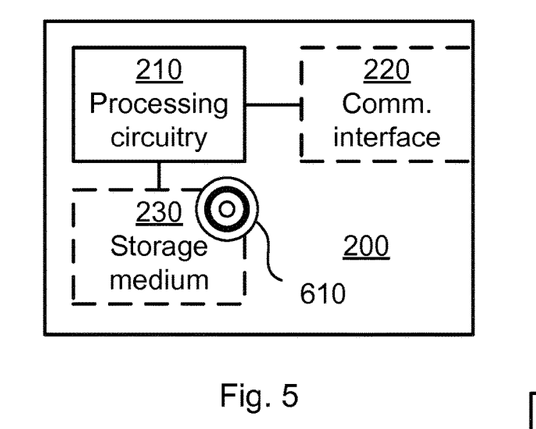
FIG. 5 is a schematic diagram showing functional units of a controller according to an embodiment.

FIG. 5 schematically illustrates, in terms of a number of functional units, the components of a controller 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 310 (as in FIG. 7), e.g. in the form of a storage medium 230. The processing circuitry 210 may further be provided as at least one application specific integrated circuit (ASIC), or field programmable gate array (FPGA).

Particularly, the processing circuitry 210 is configured to cause the controller 200 to perform a set of operations, or steps, S102-S110, as disclosed above. For example, the storage medium 230 may store the set of operations, and the processing circuitry 210 may be configured to retrieve the set of operations from the storage medium 230 to cause the controller 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The controller 200 may further comprise a communications interface 220 at least configured for communications with sensors 150. As such the communications interface 220 may comprise one or more transmitters and receivers, comprising analogue and digital components. The processing circuitry 210 controls the general operation of the controller 200 e.g. by sending data and control signals to the communications interface 220 and the storage medium 230, by receiving data and reports from the communications interface 220, and by retrieving data and instructions from the storage medium 230. Other components, as well as the related functionality, of the controller 200 are omitted in order not to obscure the concepts presented herein.

Figure 6:
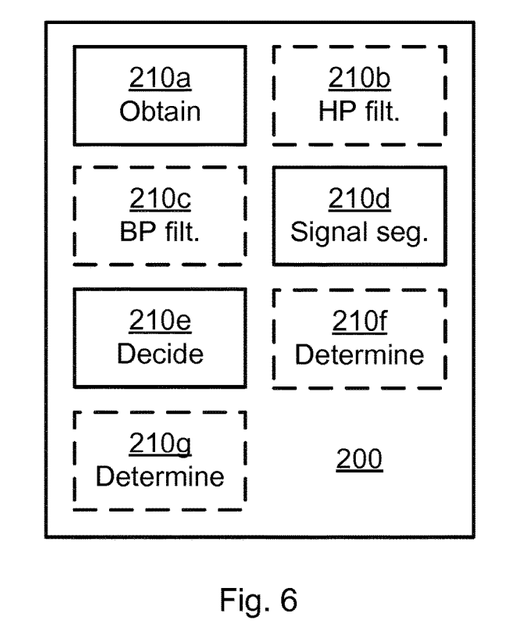
FIG. 6 is a schematic diagram showing functional modules of a controller according to an embodiment.

FIG. 6 schematically illustrates, in terms of a number of functional modules, the components of a controller 200 according to an embodiment. The controller 200 of FIG. 6 comprises a number of functional modules; an obtain module 210a configured to perform step S102, a signal segmentation module 210d configured to perform step S108, and a decide module 210e configured to perform step S110. The controller 200 of FIG. 6 may further comprise a number of optional functional modules, such as any of high-pass (HP) filter module 210b configured to perform S104, a band-pass (BP) filtering module 210c configured to perform S106, a determine module 210f configured to perform step S112, and a determine module 210g configured to perform step S114. In general terms, each functional module 210a-210g may in one embodiment be implemented only in hardware or and in another embodiment with the help of software, i.e., the latter embodiment having computer program instructions stored on the storage medium 230 which when run on the processing circuitry makes the controller 200 perform the corresponding steps mentioned above in conjunction with FIG. 6. It should also be mentioned that even though the modules correspond to parts of a computer program, they do not need to be separate modules therein, but the way in which they are implemented in software is dependent on the programming language used. Preferably, one or more or all functional modules 210a-210e may be implemented by the processing circuitry 210, possibly in cooperation with functional units 220 and/or 230. The processing circuitry 210 may thus be configured to from the storage medium 230 fetch instructions as provided by a functional module 210a-210g and to execute these instructions, thereby performing any steps as disclosed herein.

The controller 200 may be provided as a standalone device or as a part of at least one further device. For example, the controller 200 may be provided in the azimuth thruster 100. A first portion of the instructions performed by the controller 200 may be executed in a first device, and a second portion of the of the instructions performed by the controller 200 may be executed in a second device; the herein disclosed embodiments are not limited to any particular number of devices on which the instructions performed by the controller 200 may be executed. Hence, the methods according to the herein disclosed embodiments are suitable to be performed by a controller 200 residing in a cloud computational environment. Therefore, although a single processing circuitry 210 is illustrated in FIG. 5 the processing circuitry 210 may be distributed among a plurality of devices, or nodes. The same applies to the functional modules 210a-210g of FIG. 6 and the computer program 320 of FIG. 7 (see below).

Figure 7:
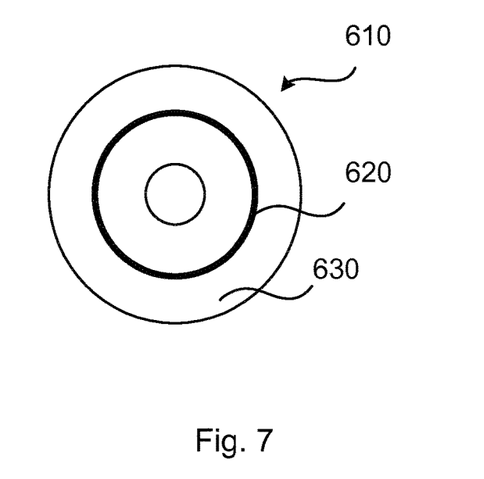
FIG. 7 shows one example of a computer program product comprising computer readable storage medium according to an embodiment.

FIG. 7 shows one example of a computer program product 610 comprising computer readable storage medium 630. On this computer readable storage medium 630, a computer program 620 can be stored, which computer program 620 can cause the processing circuitry 210 and thereto operatively coupled entities and devices, such as the communications interface 220 and the storage medium 230, to execute methods according to embodiments described herein. The computer program 620 and/or computer program product 610 may thus provide means for performing any steps as herein disclosed.

In the example of FIG. 7, the computer program product 610 is illustrated as an optical disc, such as a CD (compact disc) or a DVD (digital versatile disc) or a Blu-Ray disc. The computer program product 610 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 620 is here schematically shown as a track on the depicted optical disk, the computer program 630 can be stored in any way which is suitable for the computer program product 610.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for deciding whether a bearing is faulty or not, the method being performed by a controller, the method comprising:
obtaining a signal representing vibrations of the bearing, wherein the vibrations are obtained during operation of the bearing;
applying signal segmentation to the signal in at least two frequency bands in order to identify any shock pulse in the signal, wherein the signal is adaptively divided in the at least two frequency bands, wherein impulses excited by any fault in each of the frequency bands is searched for using a sliding window approach on the signal in each frequency band in time domain, and wherein the sliding window approach comprises a reference window and a test window, the reference window being longer than the test window, using a non-parametric model to calculate probability density estimates for the test window and the reference window and estimating the probability that there is a shock pulse within the test window from the difference between the probability density estimates of the test window and the reference window, wherein said estimating the probability that there is a shock pulse uses Kullback-Leibler divergence and a logistics function defined as:

$$\hat{P}^i_{SP}[k]=1/(1+\exp(-\beta_0-\beta_1 D^i_{KL}[k]))$$

wherein $\beta_0$ and $\beta_1$ are parameters determined using data or theoretical distribution models, wherein $\beta_0$ and $\beta_1$ are non-zero values, and wherein $D^i_{KL}[k]$ is the Kullback-Leibler divergence;
calculating a fault indicator for each of the at least two frequency bands using results from the estimated probability and assumed bearing fault frequencies; and
deciding whether the bearing is faulty or not depending on whether or not the signal includes said any shock pulse, and based on the fault indicator, if any frequency of the shock pulses is compatible with any of the bearing fault frequencies.

2. The method according to claim 1, wherein said any shock pulse is caused by a fault in the bearing.

3. The method according to claim 1, wherein the bearing is decided as faulty when at least one shock pulse is identified in at least one of the at least two frequency bands of the signal.

4. The method according to claim 1, wherein the signal is, in each frequency band, analyzed in time domain.

5. The method according to claim 1, wherein there is a plurality of frequency bands in which said signal segmentation is applied to the signal.

6. The method according to claim 1, further comprising:
determining, when it has been decided that the bearing is faulty, fault type of the fault.

7. The method according to claim 6, wherein the fault type is one of Ball Pass Frequency Inner (BPFI), Ball Pass Frequency Outer (BPFO), Ball Spin Frequency (BSF).

8. The method according to claim 1, further comprising:
determining a reliability measure of the deciding.

9. The method according to claim 8, wherein the reliability measure is dependent on in how many of the frequency bands said any shock pulse has been identified.

10. The method according to claim 8, wherein the reliability measure is dependent on a magnitude of said any shock pulse.

11. The method according to claim 1, further comprising:
applying high-pass filtering to the signal before applying the signal segmentation.

12. The method according to claim 11, wherein the high-pass filtering has a cut-off frequency of at least 1 kHz.

13. The method according to claim 12, wherein the cut-off frequency of the high-pass filtering is between 1 kHz and 2 kHz.

14. The method according to claim 11, further comprising:
applying band-pass filtering to the signal so as to split the signal into the at least two frequency bands;
wherein the band-pass filtering is applied to the signal after applying the high-pass filtering.

15. The method according to claim 1, further comprising:
applying band-pass filtering to the signal so as to split the signal into the at least two frequency bands.

16. The method according to claim 15, wherein the band-pass filtering uses filter coefficients determined from the signal.

17. The method according to claim 15, wherein the filter coefficients are determined from eigenvalues and eigenvectors of an autocorrelation matrix of the signal.

18. The method according to claim 15, wherein the band-pass filtering divides the signal into orthogonal sequences.

19. The method according to claim 1, wherein the signal includes noise, and wherein the deciding includes estimating a repetition frequency of said any shock pulse and then deciding if amplitude at the repetition frequency differentiates from the noise in the signal.

20. The method according to claim 1, wherein the bearing is a rolling-element bearing.

21. The method according to claim 1, wherein the bearing is part of an electric podded azimuth thruster.

22. A controller for deciding whether a bearing is faulty or not, the controller comprising processing circuitry, the processing circuitry being configured to cause the controller to:
  obtain a signal representing vibrations of the bearing, wherein the vibrations are obtained during operation of the bearing;
  apply signal segmentation to the signal in at least two frequency bands in order to identify any shock pulse in the signal, wherein the signal is adaptively divided in the at least two frequency bands, wherein impulses excited by any fault in each of the frequency bands is searched for using a sliding window approach on the signal in each frequency band in time domain, and wherein the sliding window approach comprises a reference and a test window, the reference window being longer than the test window, using a non-parametric model to calculate probability density estimates for the test window and the reference window and estimating the probability that there is a shock pulse within the test window from the difference between the probability density estimates of the test window and the reference window, wherein said estimating the probability that there is a shock pulse uses Kullback-Leibler divergence and a logistics function defined as:

$$\hat{P}^i_{SP}[k]=1/(1+\exp(-\beta_0-\beta_1 D^i_{KL}[k]))$$

wherein $\beta_0$ and $\beta_1$ are parameters determined using data or theoretical distribution models, wherein $\beta_0$ and $\beta_1$ are non-zero values, and wherein $D^i_{KL}[k]$ is the Kullback-Leibler divergence;
  calculate a fault indicator for each of the at least two frequency bands using results from the estimated probability and assumed bearing fault frequencies; and
  decide whether the bearing is faulty or not depending on whether or not the signal includes said any shock pulse, and based on the fault indicator, if any frequency of the shock pulses is compatible with any of the bearing fault frequencies.

23. A computer program product for deciding whether a bearing is faulty or not, the computer program product comprising a computer program and a non-transitory computer readable storage medium on which the computer program is stored, the computer program comprising computer code which, when run on processing circuitry of a controller, causes the controller to:
  obtain a signal representing vibrations of the bearing, wherein the vibrations are obtained during operation of the bearing;
  apply signal segmentation to the signal in at least two frequency bands in order to identify any shock pulse in the signal, wherein the signal is adaptively divided in the at least two frequency bands, wherein impulses excited by any fault in each of the frequency bands is searched for using a sliding window approach on the signal in each frequency band in time domain, and wherein the sliding window approach comprises a reference and a test window, the reference window being longer than the test window, using a non-parametric model to calculate probability density estimates for the test window and the reference window and estimating the probability that there is a shock pulse within the test window from the difference between the probability density estimates of the test window and the reference window, wherein said estimating the probability that there is a shock pulse uses Kullback-Leibler divergence and a logistics function defined as:

$$\hat{P}^i_{SP}[k]=1/(1+\exp(-\beta_0-\beta_1 D^i_{KL}[k]))$$

wherein $\beta_0$ and $\beta_1$ are parameters determined using data or theoretical distribution models, wherein $\beta_0$ and $\beta_1$ is a are non-zero values, and wherein $D^i_{KL}[k]$ is the Kullback-Leibler divergence;
  calculate a fault indicator for each of the at least two frequency bands using results from the estimated probability and assumed bearing fault frequencies; and
  decide whether the bearing is faulty or not depending on whether or not the signal includes said any shock pulse, and based on the fault indicator, if any frequency of the shock pulses is compatible with any of the bearing fault frequencies.

* * * * *